United States Patent
Ito et al.

(10) Patent No.: US 6,803,001 B2
(45) Date of Patent: Oct. 12, 2004

(54) METHOD FOR MAKING WINDOW PANEL UNITS HAVING IN SITU EXTRUDED FRAMES

(75) Inventors: Toshikazu Ito, Obu (JP); Yoshihiro Suita, Obu (JP)

(73) Assignee: Tokai Kogyo Kabushiki Kaisha, Obu (JP)

( * ) Notice: Subject to any disclaimer, the term of this patent is extended or adjusted under 35 U.S.C. 154(b) by 578 days.

(21) Appl. No.: 09/764,106

(22) Filed: Jan. 19, 2001

(65) Prior Publication Data

US 2001/0001182 A1 May 17, 2001

Related U.S. Application Data

(63) Continuation of application No. 09/229,990, filed on Jan. 14, 1999, now Pat. No. 6,287,406, which is a continuation of application No. 08/372,320, filed on Jan. 13, 1995, now Pat. No. 6,106,931, which is a continuation of application No. 08/088,520, filed on Jul. 1, 1993, now Pat. No. 5,411,696, which is a continuation-in-part of application No. 07/727,945, filed on Jul. 10, 1991, now abandoned.

(30) Foreign Application Priority Data

Dec. 27, 1990 (JP) ............................................. 2-415994

(51) Int. Cl.[7] .............................................. B29C 47/02
(52) U.S. Cl. ....................... 264/138; 264/254; 264/275; 264/161
(58) Field of Search ................................ 264/161, 250, 264/254, 255, 275, 279

(56) References Cited

U.S. PATENT DOCUMENTS

| 2,293,252 A | 8/1942 | Foster et al. |
| 3,779,794 A | 12/1973 | De Santis |
| 4,072,340 A | 2/1978 | Morgan |
| 4,085,238 A | 4/1978 | Chenel et al. |
| 4,088,366 A | 5/1978 | Gallitzendorfer et al. |
| 4,139,234 A | 2/1979 | Morgan |
| 4,145,171 A | 3/1979 | Guzowski |
| 4,363,191 A | 12/1982 | Morgan |
| 4,541,881 A | 9/1985 | Sebastiano |
| 4,543,283 A | 9/1985 | Curtze et al. |
| 4,551,372 A | 11/1985 | Kunert |
| 4,559,001 A | 12/1985 | Wiedenhofer et al. |
| 4,561,625 A | 12/1985 | Weaver |
| 4,576,773 A | 3/1986 | Azzola et al. |
| 4,581,276 A | 4/1986 | Kunert et al. |
| 4,584,155 A | 4/1986 | Zanella |
| 4,626,185 A | 12/1986 | Monnet |
| 4,645,970 A | 2/1987 | Murphy |
| 4,662,113 A | 5/1987 | Weaver |
| 4,688,752 A | 8/1987 | Barteck et al. |
| 4,712,826 A | 12/1987 | Omori |
| 4,854,636 A | 8/1989 | Greenhalgh et al. |

(List continued on next page.)

FOREIGN PATENT DOCUMENTS

| CA | 1183520 | 3/1985 |
| DE | 3818603 | 12/1989 |
| DE | 4025166 | 8/1990 |

(List continued on next page.)

Primary Examiner—Edmund H. Lee
(74) Attorney, Agent, or Firm—Dennison, Schultz, Dougherty & MacDonald

(57) ABSTRACT

A method of manufacturing a panel unit having a curved panel and a directly extruded molding. The peripheral edge of the curved panel is moved relative to an extrusion port of an extrusion molding die and a resin molding material is simultaneously extruded directly onto a peripheral edge of the curved panel. While extruding the molding material, the peripheral edge of the curved panel is tilted in response to movement of the curved panel relative to the extrusion port in order to maintain a constant angle between the peripheral edge of the curved panel and the extrusion port.

18 Claims, 12 Drawing Sheets

U.S. PATENT DOCUMENTS

| | | | |
|---|---|---|---|
| 4,857,376 | A | 8/1989 | Von Reis et al. |
| 4,879,853 | A | 11/1989 | Braendle et al. |
| 4,884,380 | A | 12/1989 | Yada et al. |
| 4,933,032 | A | 6/1990 | Kunert |
| 4,973,436 | A | 11/1990 | Lisec |
| 4,986,867 | A | 1/1991 | Braendle et al. |
| 4,993,774 | A | 2/1991 | Greenhalgh et al. |
| 4,994,315 | A | 2/1991 | Schreiber et al. |
| 5,009,462 | A | 4/1991 | Katcherian |
| 5,057,265 | A | 10/1991 | Kunert et al. |
| 5,057,354 | A | 10/1991 | Kunert et al. |
| 5,069,852 | A | 12/1991 | Leone et al. |
| 5,085,021 | A | 2/1992 | Kunert |
| 5,095,669 | A | 3/1992 | Kunert |
| 5,108,526 | A | 4/1992 | Cornils et al. |
| 5,167,756 | A | 12/1992 | Lenhardt |
| 5,183,612 | A | 2/1993 | Suita et al. |
| 5,242,518 | A | 9/1993 | Riederer |
| 5,302,333 | A | 4/1994 | Capriotti et al. |
| 5,316,829 | A | 5/1994 | Cordes et al. |
| 5,336,349 | A | 8/1994 | Cornils et al. |
| 5,362,428 | A | 11/1994 | Tsujino et al. |
| 5,384,995 | A | 1/1995 | Kunert et al. |
| 5,411,696 | A | 5/1995 | Ito et al. |
| 5,456,874 | A | 10/1995 | Cordes et al. |
| 5,464,575 | A | 11/1995 | Jaffiol et al. |
| 5,498,391 | A | 3/1996 | Ito et al. |
| 5,603,886 | A | 2/1997 | Ito et al. |
| 5,645,785 | A * | 7/1997 | Cornils et al. .............. 264/252 |
| 6,106,931 | A | 8/2000 | Ito et al. |

FOREIGN PATENT DOCUMENTS

| | | |
|---|---|---|
| EP | 0069021 | 1/1983 |
| EP | 0076924 | 4/1983 |
| EP | 0127546 | 12/1984 |
| EP | 0145354 | 6/1985 |
| EP | 0255218 | 2/1988 |
| EP | 0368669 | 5/1990 |
| EP | 0371773 | 6/1990 |
| EP | 0371810 | 6/1990 |
| EP | 0421833 | 4/1991 |
| EP | 0436438 | 7/1991 |
| EP | 0524060 | 1/1993 |
| FR | 2247341 | 5/1975 |
| FR | 2294140 | 6/1976 |
| FR | 2 32409 | 6/1977 |
| FR | 2358366 | 2/1978 |
| GB | 1544420 | 5/1975 |
| GB | 1510208 | 5/1978 |
| GB | 1546011 | 5/1979 |
| GB | 2016960 | 7/1979 |
| GB | 2099688 | 12/1982 |
| JP | 55022967 | 2/1980 |
| JP | 55079114 | 6/1980 |
| JP | 57011111 | 1/1982 |
| JP | 57158479 | 9/1982 |
| JP | 58194910 | 12/1983 |
| JP | 59003051 | 1/1984 |
| JP | 59077920 | 5/1984 |
| JP | 59124810 | 7/1984 |
| JP | 59154419 | 10/1984 |
| JP | 59187986 | 10/1984 |
| JP | 61129321 | 6/1986 |
| JP | 62053220 | 3/1987 |
| JP | 62112918 | 7/1987 |
| JP | 62155123 | 7/1987 |
| JP | 62251229 | 11/1987 |
| JP | 62257831 | 11/1987 |
| JP | 62268729 | 11/1987 |
| JP | 63008022 | 1/1988 |
| JP | 63015716 | 1/1988 |
| JP | 63 32916 | 3/1988 |
| JP | 63093618 | 4/1988 |
| JP | 63154420 | 6/1988 |
| JP | 63159126 | 7/1988 |
| JP | 63155812 | 10/1988 |
| JP | 63297009 | 12/1988 |
| JP | 02060722 | 3/1990 |
| JP | 02182424 | 7/1990 |
| JP | 02261186 | 10/1990 |
| JP | 02261187 | 10/1990 |
| JP | 03130136 | 6/1991 |
| JP | 02274614 | 11/1991 |
| JP | 04151225 | 5/1992 |
| JP | 04226321 | 8/1992 |

* cited by examiner

METHOD FOR MAKING WINDOW PANEL UNITS HAVING IN SITU EXTRUDED FRAMES

CROSS-REFERENCE TO RELATED APPLICATION

This application is a continuation of application Ser. No. 09/229,990 filed Jan. 14, 1999, now U.S. Pat. No. 6,287,406, which is a continuation of Ser. No. 08/372,320 filed Jan. 13, 1995, now U.S. Pat. No. 6,106,931, which is a continuation of Ser. No. 08/088,520 filed Jul. 1, 1993, now U.S. Pat. No. 5,411,696, which is a continuation-in-part of Ser. No. 07/727,945 filed Jul. 10, 1991, now abandoned.

BACKGROUND OF THE INVENTION

The present invention relates to a panel with a frame (which will be hereinafter referred to as a panel unit), and also relates to a method for manufacturing such a panel unit.

It is known that a frame to be mounted on a peripheral edge of a panel such as a window glass for a vehicle is linearly molded by extruding synthetic resin, rubber or the like. The linear molding for the frame is then mounted on the peripheral edge of the panel and bonded thereto with a portion of the frame bent at each corner portion of the panel.

In such a conventional panel unit to be manufactured by employing a linear molding, much time and labor are required in mounting the frame on the peripheral edge of the panel and bonding the frame thereto. Furthermore, there is a possibility of wrinkling and floating of the frame at each corner portion of the panel or in the vicinity thereof. This tends to impair appearance of the panel.

A technique of eliminating the awkward operation in mounting the frame on the peripheral edge of the panel is disclosed in Japanese Laid-open Patent Publication No. 63-15716, for example.

According to this prior art technique, a panel is set within a pair of injection molding dies, and the dies are closed. Then, molding material such as resin and rubber is injected into a cavity defined around the peripheral edge of the panel, thereby forming a frame on the peripheral edge of the panel.

However, in the case that the panel is large in size, the cost of manufacturing the injection molding dies becomes high. This will increase the cost of manufacturing the panel unit.

Furthermore, in closing the injection molding dies, a closing pressure is applied to the panel which tends to damage the panel. Additionally, the molding surface of the dies is marred by the damaged panel, resulting in surface defects of the frame.

A technique for forming the frame on the peripheral edge of the panel is disclosed in the U.S. Pat. No. 5,057,265 by Kunert et al.

In this prior art technique, a frame is formed along the peripheral edge of a panel. However, such a technique does not permit formation of a frame which covers a part of the upper and lower surfaces and the end surface of the panel. Also, such a technique, if there is a variation in the external dimension of the panel, does not provide a panel unit having a predetermined external dimension.

SUMMARY OF THE INVENTION

It is, accordingly, an object of the present invention to provide a panel unit which can eliminate the awkward operation in mounting a frame on the peripheral edge of a panel and prevent wrinkling and floating of the frame at each corner portion of the panel or in the vicinity thereof.

It is another object of the present invention to provide a panel unit having a frame which is formed on the peripheral edge of a panel so as to cover a part of the upper and lower surfaces and the end surface of the panel, and having a predetermined external dimension.

It is a further object of the present invention to provide a method for manufacturing such a panel unit easily at low costs.

According to a first aspect of the present invention, there is provided a panel unit comprising a window glass panel, and a frame continuously formed on a peripheral edge of the window glass by extrusion molding and simultaneously bonded to the peripheral edge of the window glass panel, the frame being formed on the peripheral edge of the window glass panel so as to cover a part of the upper and lower surfaces and the end surface of the window glass panel.

The frame is continuously formed on the peripheral edge of the window glass panel by extrusion molding and is simultaneously bonded thereto. Accordingly, the awkward operation in mounting the frame along the peripheral edge of the window glass panel is eliminated. Further, wrinkling and floating of the frame at each corner portion of the panel or in the vicinity thereof is prevented.

The frame is formed on the peripheral edge of a panel so as to cover a part of the upper and lower surfaces and the end surface of the panel. Accordingly, the frame may effectively protect the peripheral edge of the panel. The frame may also cover an adhesive which is used to bond the frame to the panel, thereby to prevent the adhesive from deterioration by ultraviolet light.

According to a second aspect of the present invention, there is provided a method of manufacturing a panel unit including a window glass panel, and a frame mounted on a peripheral edge of the window glass panel. The method comprises the steps of providing a window glass panel, preparing molding die means having an extrusion port for extruding a molding material, the extrusion port having an inner circumferential surface configured to a cross section of a frame to be mounted on the peripheral edge of the window glass panel, and an open side surface shaped to externally receive the peripheral edge of the window glass panel, inserting a part of the peripheral edge of the window glass panel into the open side surface of the extrusion port to form a molding space defined by the peripheral edge of the window glass panel and the inner circumferential surface of the extrusion port, the molding space corresponding to the cross section of the frame and having an opening, extruding the molding material from the extrusion port of the molding die means into the molding space, and providing continuous movement of the window glass panel relative to the molding die means so that the extrusion port of the molding die means is virtually moved around the peripheral edge of the window glass panel, thereby forming the frame covering end surface and a part of the upper and lower surfaces of the window glass and extending along the peripheral edge of the window glass.

The method may permit manufacturing such a panel unit having a frame which covers a part of the upper and lower surfaces and the end surface of a panel at low costs.

Other objects and features of the invention will be more fully understood from the following detailed description and appended claims when taken with the accompanying drawings.

DETAILED DESCRIPTION OF THE PREFERRED EMBODIMENT

A panel unit according to a first embodiment of the present invention will now be described with reference to FIGS. 1 to 3. In the preferred embodiment, the panel unit is constructed as a front window glass with a molding for a vehicle.

Figure 1:
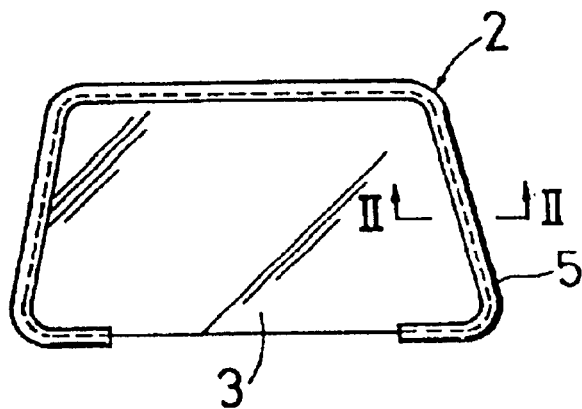
FIG. 1 is an elevational view of the panel unit according to the present invention.
Figure 2:
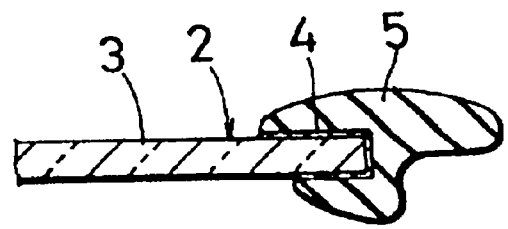
FIG. 2 is a sectional view taken along the line II—II in FIG. 1.
Figure 3:
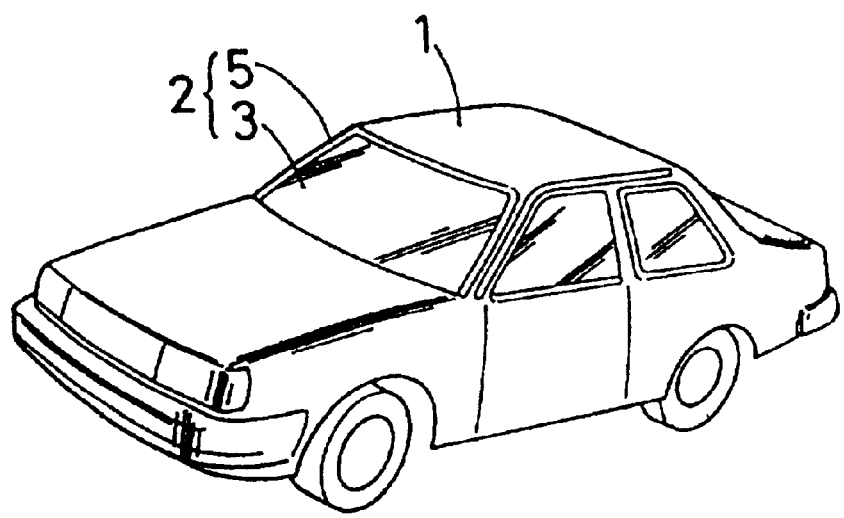
FIG. 3 is a schematic perspective view of a vehicle having the panel unit shown in FIG. 1.

Referring to FIGS. 1 to 3, shown therein and generally designated by the reference number 2 is a panel unit adapted to be fitted in a front opening of a vehicle body 1. The panel unit 2 is comprised of a window glass 3 as a panel and a molding 5 as a frame fixed to a peripheral edge of the window glass 3. The window glass 3 has curved glass surfaces in view of design and aerodynamic characteristics.

As shown in FIG. 2, the molding 5 is bonded to the peripheral edge of the window glass 3 by means of resin adhesive 4. Before applying the resin adhesive 4 to the peripheral edge of the window glass 3, the peripheral edge is subjected to primer treatment.

The molding 5 is formed of synthetic resin, rubber or the like. The molding 5 is formed by continuously extruding such a molding material along the peripheral edge of the window glass 3 and simultaneously bonding the extruded molding material through the resin adhesive 4 to the peripheral edge of the window glass 3. By the continuous extrusion molding, the cross section of the molding 5 is made uniform.

Thus, the molding 5 is continuous along the peripheral edge of the window glass 3 and has a uniform cross section.

Furthermore, the molding 5 is automatically fixed to the peripheral edge of the window glass 3 by extruding molding material along the peripheral edge of the window glass 3 and simultaneously bonding the extruded molding material through the resin adhesive 4 to the peripheral edge of the window glass 3. Accordingly, it is possible to eliminate the conventional awkward mounting operation wherein a molding independently formed is mounted on the peripheral edge of the window glass. Furthermore, it is possible to eliminate wrinkling and floating of the molding 5 at each corner portion of the window glass 3 or in the vicinity thereof, thereby rendering a good appearance to the panel unit.

A preferred embodiment of the manufacturing apparatus according to the present invention will now be described with reference to FIGS. 4 to 11.

Figure 4:
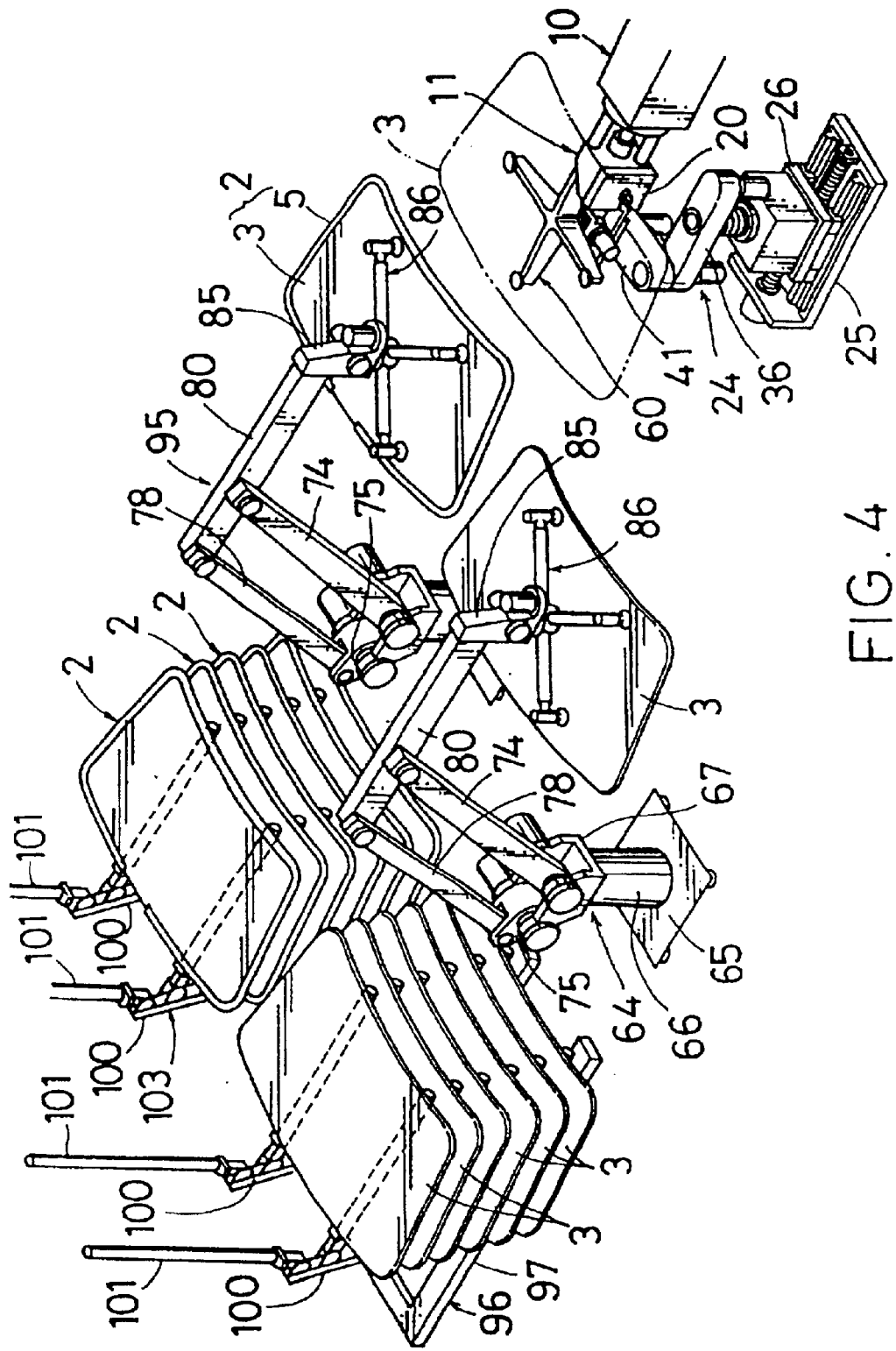
FIG. 4 is a perspective view of apparatus for manufacturing the panel unit according to the present invention.

Referring to FIG. 4, the manufacturing apparatus is generally comprised of a die means 11 connected to the front end of an extruder 10 for extruding a molding material, a panel retaining means 60 located adjacent to the die means 11 for retaining the window glass 3, a panel moving means 24 connected to the panel retaining means 60 for moving the window glass 3 retained by the panel retaining means 60, a panel supplying means 64 for supplying the window glass 3 to the panel retaining means 60, a panel unit unloading means 95 for unloading the panel unit 2 from the panel retaining means 60, a panel serving means 96 for serving a plurality of window glasses 3 to be removed one by one by the panel supplying means 64, and a panel unit receiving means 103 for receiving a plurality of panel units 2 one by one from the panel unit unloading means 95.

Figure 5:
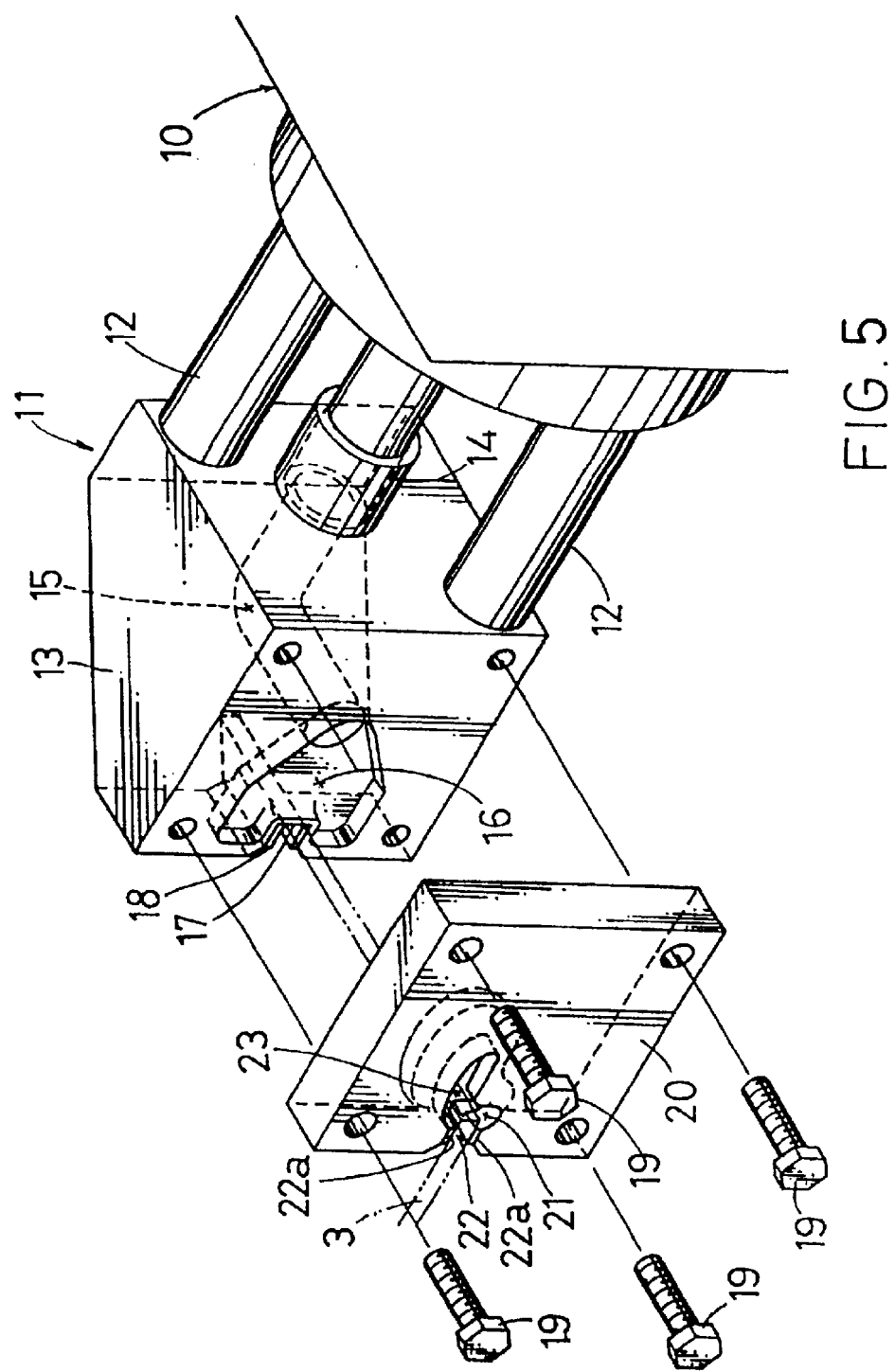
FIG. 5 is an exploded perspective view of the die means shown in FIG. 4.

Referring to FIG. 5, the die means 11 includes a die body 13 connected through a plurality of fixing bars 12 to the front end of the extruder 10. The die body 13 is formed with a molding material supplying passage 15 having one end communicating through a Joint pipe 14 to a molding material extruding passage (not shown) formed in the extruder 10 and having the other end opening to an outlet 16 recessed on a front end surface of the die body 13.

A U-shaped guide groove 17 is formed on a side surface of the die body 13 so as to engage the peripheral edge of the window glass 3 and guide movement of the window glass 3. A protection member 18 is bonded to an inner surface of the guide groove 17. The protection member 18 is made of a rubber material having an elastic compressibility.

A mouthpiece 20 is detachably mounted on the front end surface of the die body 13 by a plurality of bolts 19. The mouthpiece 20 is formed with an extrusion port 21 communicating with the outlet 16 of the molding material supplying passage 15. The mouthpiece 20 is further formed with a side opening 22 communicating with the extrusion port 21 for receiving the peripheral edge of the window glass 3. A protection member 22a is bonded to upper and lower inner surfaces of the side opening 22. The protection member 22a is formed of a rubber material having an elastic compressibility. A molding space 23 corresponding to the cross section of the molding 5 is defined by the peripheral edge of the window glass 3 inserted through the side opening 22 into the extrusion port 21 and by an inner peripheral surface of the extrusion port 21.

Figure 6:
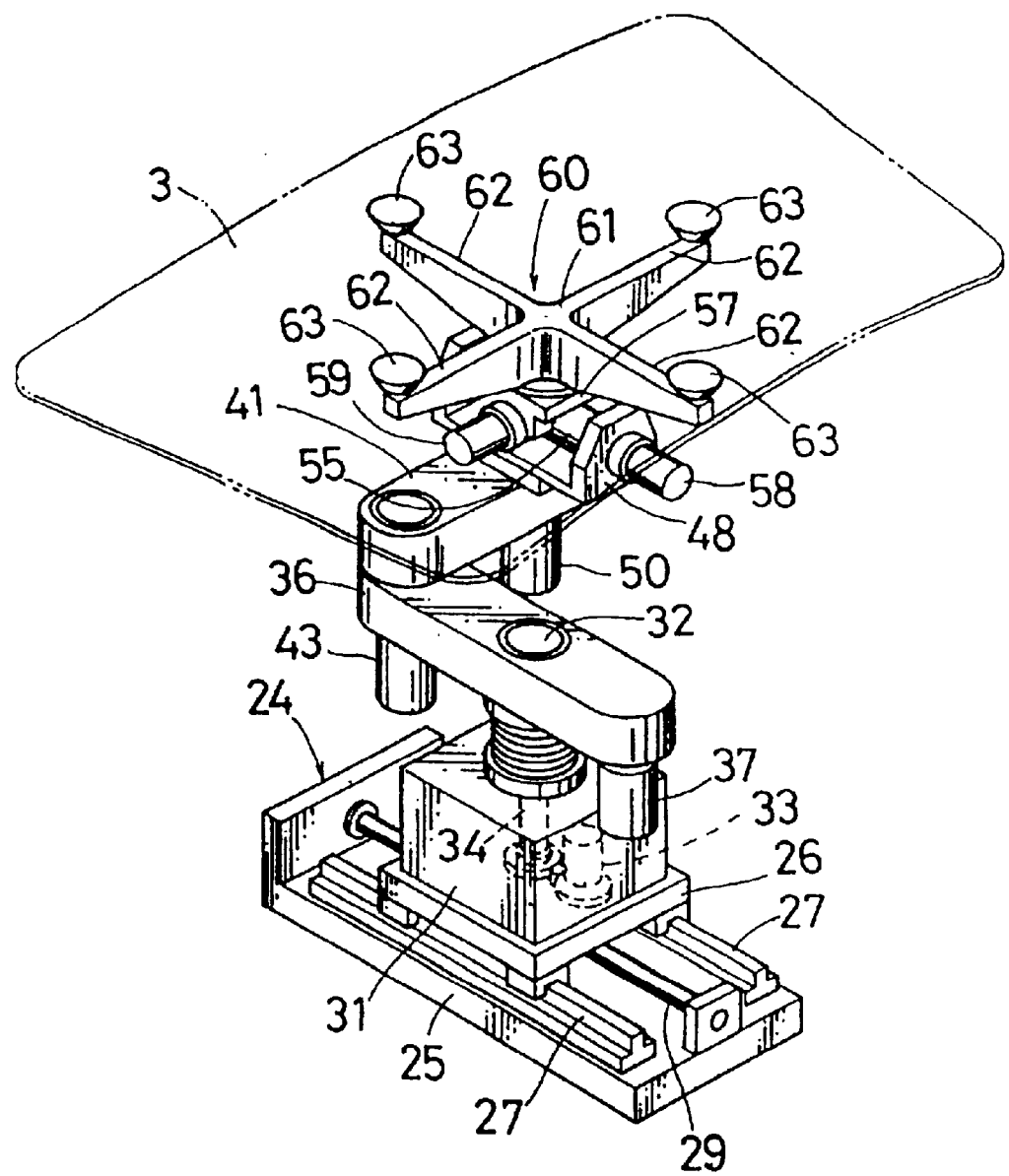
FIG. 6 is a perspective view of an assembly of the panel retaining means and the panel moving means shown in FIG. 4.
Figure 7:
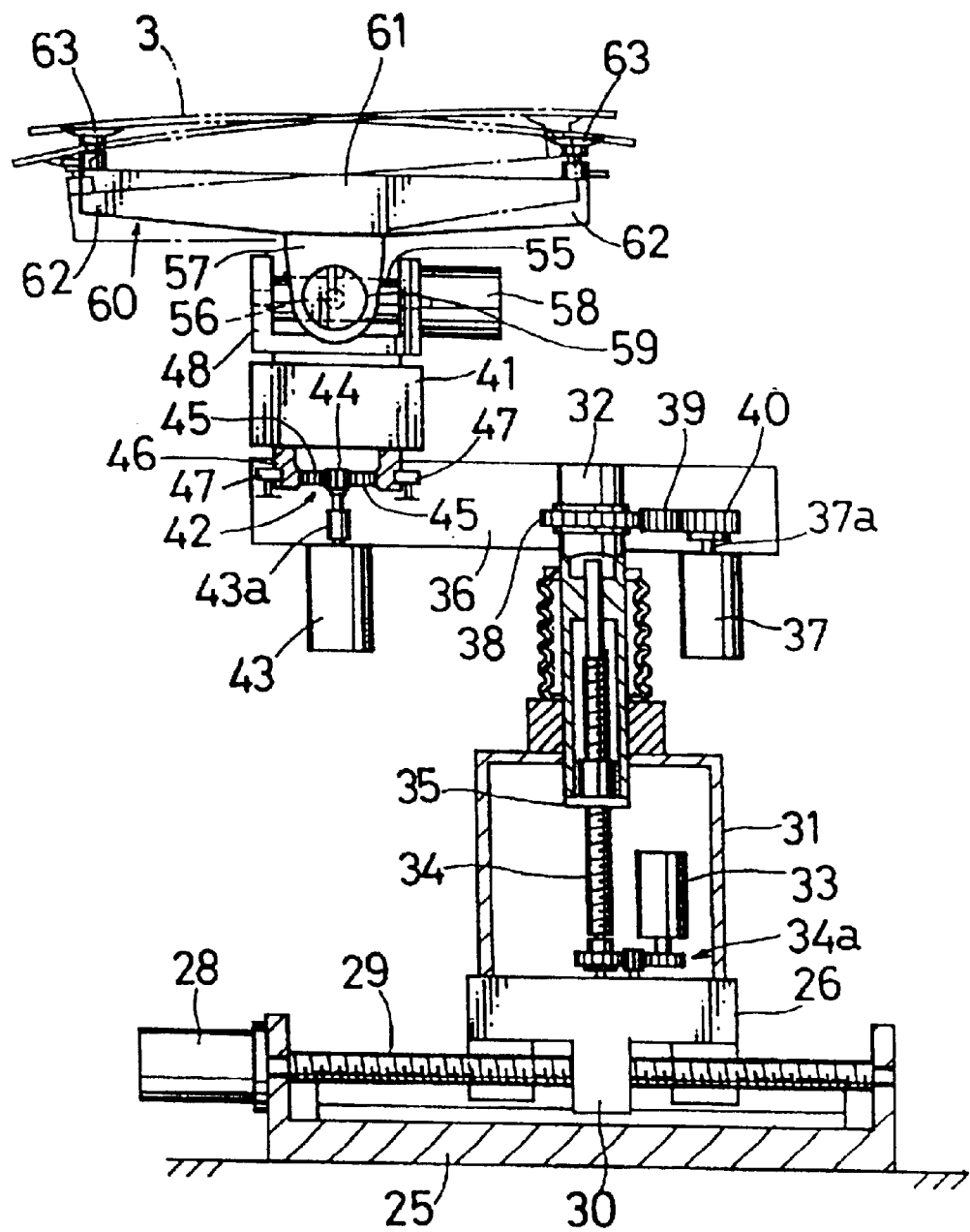
FIG. 7 is a sectional side view illustrating a driving mechanism for the panel moving means.
Figure 8:
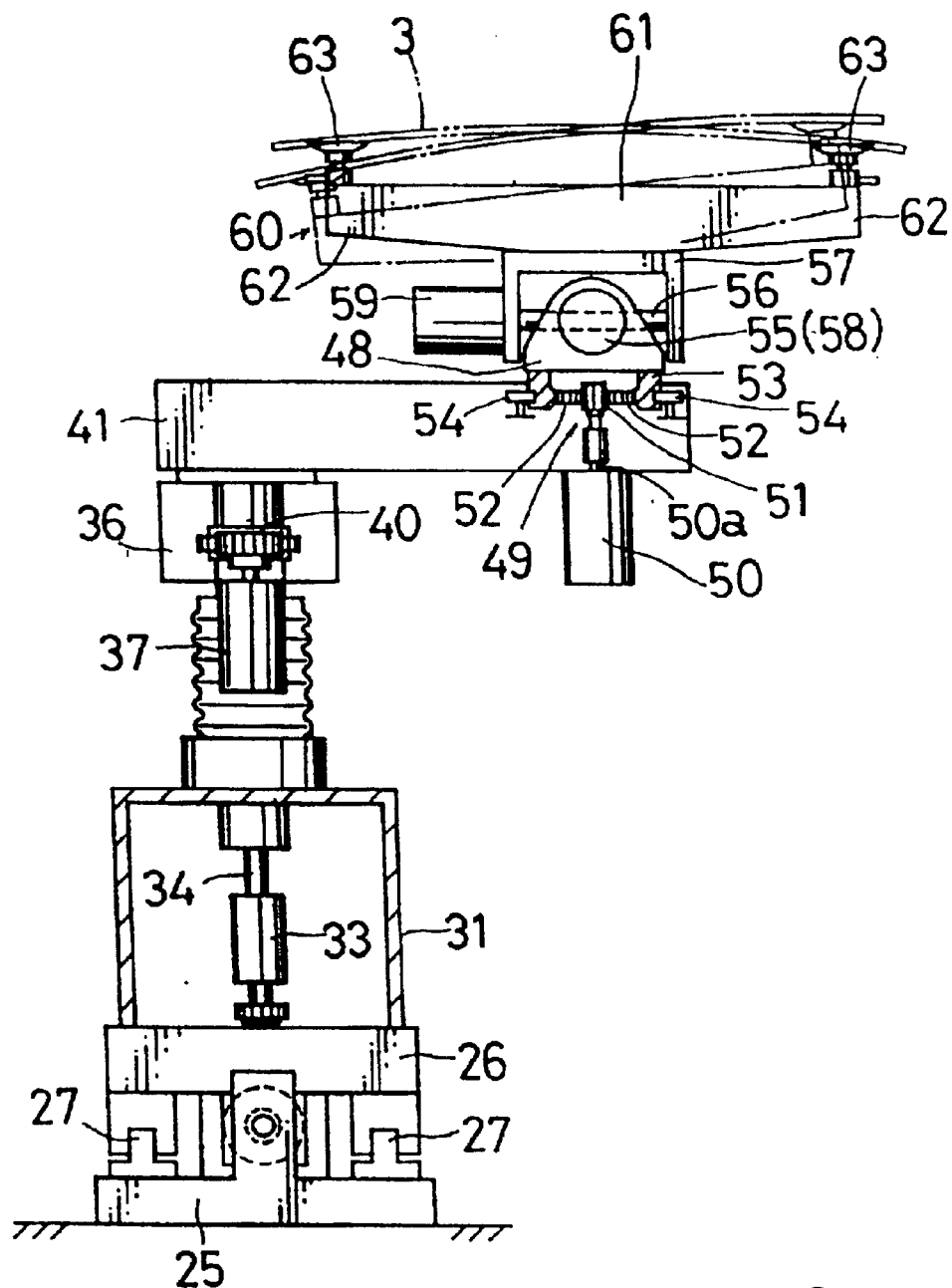
FIG. 8 is an elevational view of FIG. 7.

Referring to FIGS. 6 to 8, there is shown an assembly of the panel retaining means 60 and the panel moving means 24. The panel moving means 24 includes a base 25 fixedly mounted on a floor (not shown). A pair of rails 27 are provided on the base 25. A slide table 26 is slidably mounted on the rails 27. A screw shaft 29 is rotatably supported on the base 25. The screw shaft 29 is driven by a motor 28. As best shown in FIG. 7, a nut 30 is provided on a lower surface of the slide table 26 so as to threadedly engage the screw shaft 29. Accordingly, the slide table 26 is reciprocatingly moved along the rails 27 by driving the motor 28 to forwardly or reversely rotate the screw shaft 29.

A box-like supporting member 31 is mounted on the slide table 26. An elevating cylinder 32 is supported vertically movably but non-rotatably on an upper wall of the supporting member 31. A screw shaft 34 is rotatably supported on the elevating cylinder 32 and the slide table 26. The screw shaft 34 is driven by a motor 33 through a gear mechanism 34a. A nut 35 is fixed to a lower opening of the elevating cylinder 32 so as to threadedly engage the screw shaft 34. Accordingly, the elevating cylinder 32 is vertically moved by driving the motor 33 to forwardly or reversely rotate the screw shaft 34.

A first swivel arm 36 is mounted on an upper end portion of the elevating cylinder 32 so as to be vertically moved together with the elevating cylinder 32 and to be swiveled about the elevating cylinder 32. A fixed gear 38 is formed on an outer circumferential surface of the upper end portion of the elevating cylinder 32. A drive gear 40 is provided in the first swivel arm 36 so as to mesh with the fixed gear 38 through an intermediate gear 39. The drive gear 40 is mounted on an output shaft 37a of a motor 37 so as to be rotated together with the output shaft 37a. Accordingly, the first swivel arm 36 is swiveled about the elevating cylinder 32 by driving the motor 37 to forwardly or reversely rotate the drive gear 40.

A second swivel arm 41 is provided over an upper surface of the first swivel arm 36 at a fore end portion thereof (i.e., left end portion as viewed in FIG. 7) so as to be swiveled at its base end portion (i.e., left end portion as viewed in FIG. 8) by a planetary gear mechanism 42. That is, a sun gear 44 rotating together with an output shaft 43a of a motor 43 and a plurality of planetary gears 45 meshing with the sun gear 44 are provided in the fore end portion of the first swivel arm 36. On the other hand, an outer ring gear 46 meshing with the planetary gears 45 is so formed as to project from a lower surface of the base end portion of the second swivel arm 41. The outer ring gear 46 is guided by a plurality of guide rollers 47 rotatably supported in the fore end portion of the first swivel arm 36. Accordingly, the second swivel arm 41 is swiveled about the sun gear 44 by driving the motor 43 to rotate the sun gear 44 and accordingly rotate the outer ring gear 46 guided by the guide rollers 47.

As shown in FIG. 8, a rotating member 48 is provided over an upper surface of the second swivel arm 41 at a fore end portion thereof (i.e., right end portion as viewed in FIG. 8) so as to be rotated by a planetary gear mechanism 49. That is, a sun gear 51 rotating together with an output shaft 50a of a motor 50 and a plurality of planetary gears 52 meshing with the sun gear 51 are provided in the fore end portion of the second swivel arm 41. On the other hand, an outer ring gear 53 meshing with the planetary gears 52 is so formed as to project from a lower surface of the rotating member 48. The outer ring gear 53 is guided by a plurality of guide rollers 54 rotatably supported in the fore end portion of the second swivel arm 41. Accordingly, the rotating member 48 is rotated about the sun gear 51 by driving the motor 50 to rotate the sun gear 51 and accordingly rotate the outer ring gear 53 guided by the guide rollers 54.

A tilting member 57 is supported on the rotating member 48 through first and second shafts 55 and 56 crossing each other so as to be tiltable about an axis of the first shaft 55 and an axis of the second shaft 56. As shown in FIG. 7, the first shaft 55 is rotatably supported by a pair of bearings (not shown) on opposite side walls of the rotating member 48, and one end of the first shaft 55 is directly connected to an output shaft of a motor 58 mounted on an outer surface of one of the opposite side walls of the rotating member 48.

As shown in FIG. 8, the second shaft 56 extends through the fist shaft 55 in orthogonal relationship with each other, and they are fixed together. The second shaft 56 is rotatably supported by a pair of bearings (not shown) on opposite side walls of the tilting member 57, and one end of the second shaft 56 is directly connected to an output shaft of a motor 59 mounted on an outer surface of one of the opposite side walls of the tilting member 57.

Accordingly, the tilting member 57 is tilted in a clockwise or counterclockwise direction as viewed in FIG. 8 by driving the motor 58 to forwardly or reversely rotate the first shaft 55. Further, the tilting member 57 is tilted in a clockwise or counterclockwise direction as viewed in FIG. 7 by driving the motor 59 to forwardly or reversely rotate the second shaft 56.

The panel retaining means 60 is mounted on an upper surface of the tilting member 57. The panel retaining means 60 is generally comprised of a retaining member 61 having four orthogonal arms 62 fixed to the upper surface of the tilting member 57 and of four suction cups 63 each mounted on an upper surface of the arm 62 at an outer end thereof. Each suction cup 63 is connected to a vacuum source (not shown). Accordingly, under the condition where the window glass 3 is positioned on the suction cups 63, the window glass 3 is retained by vacuum generated in the suction cups 63.

Figure 9:
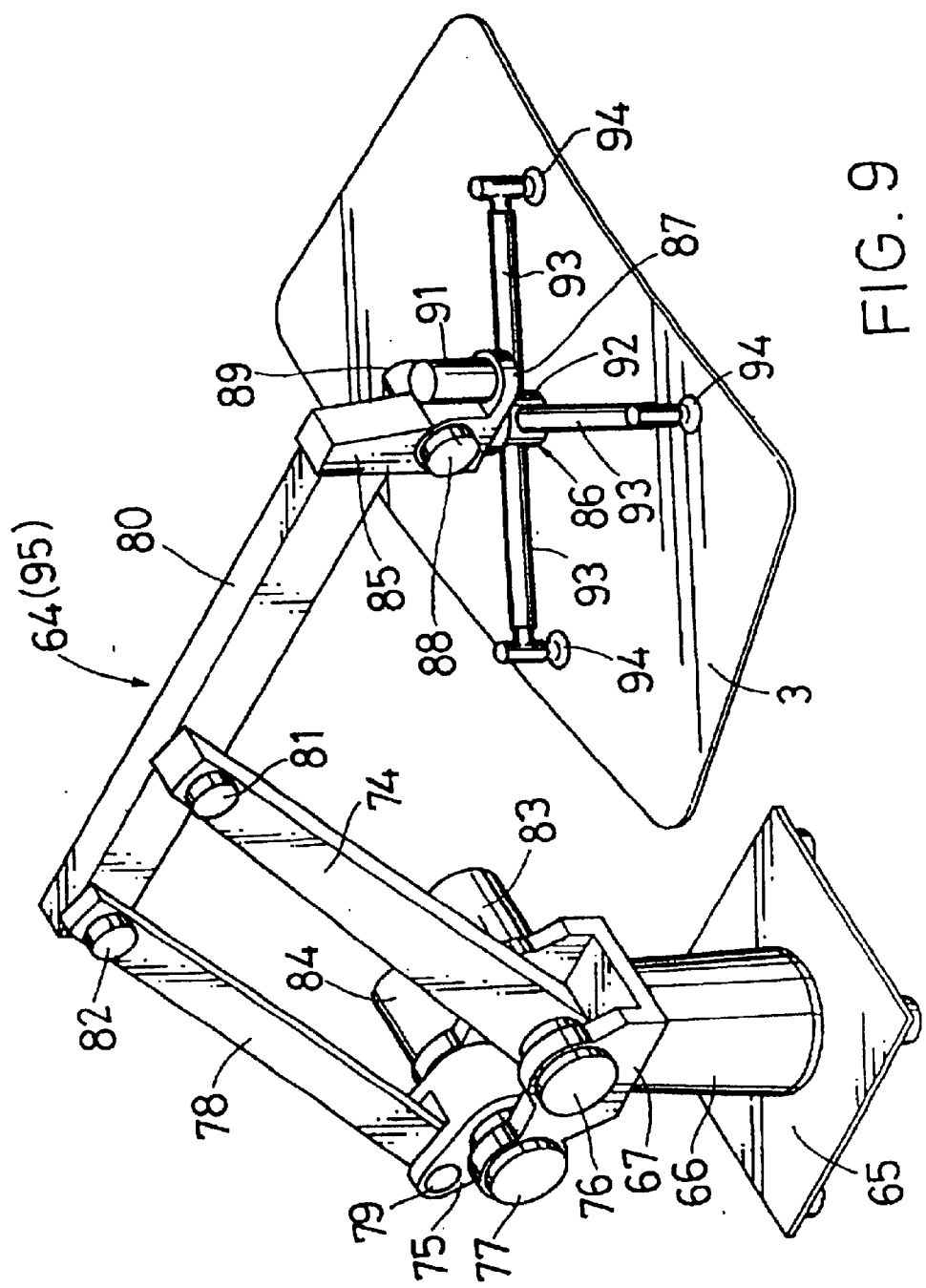
FIG. 9 is a perspective view of the panel supplying means shown in FIG. 4.
Figure 10:
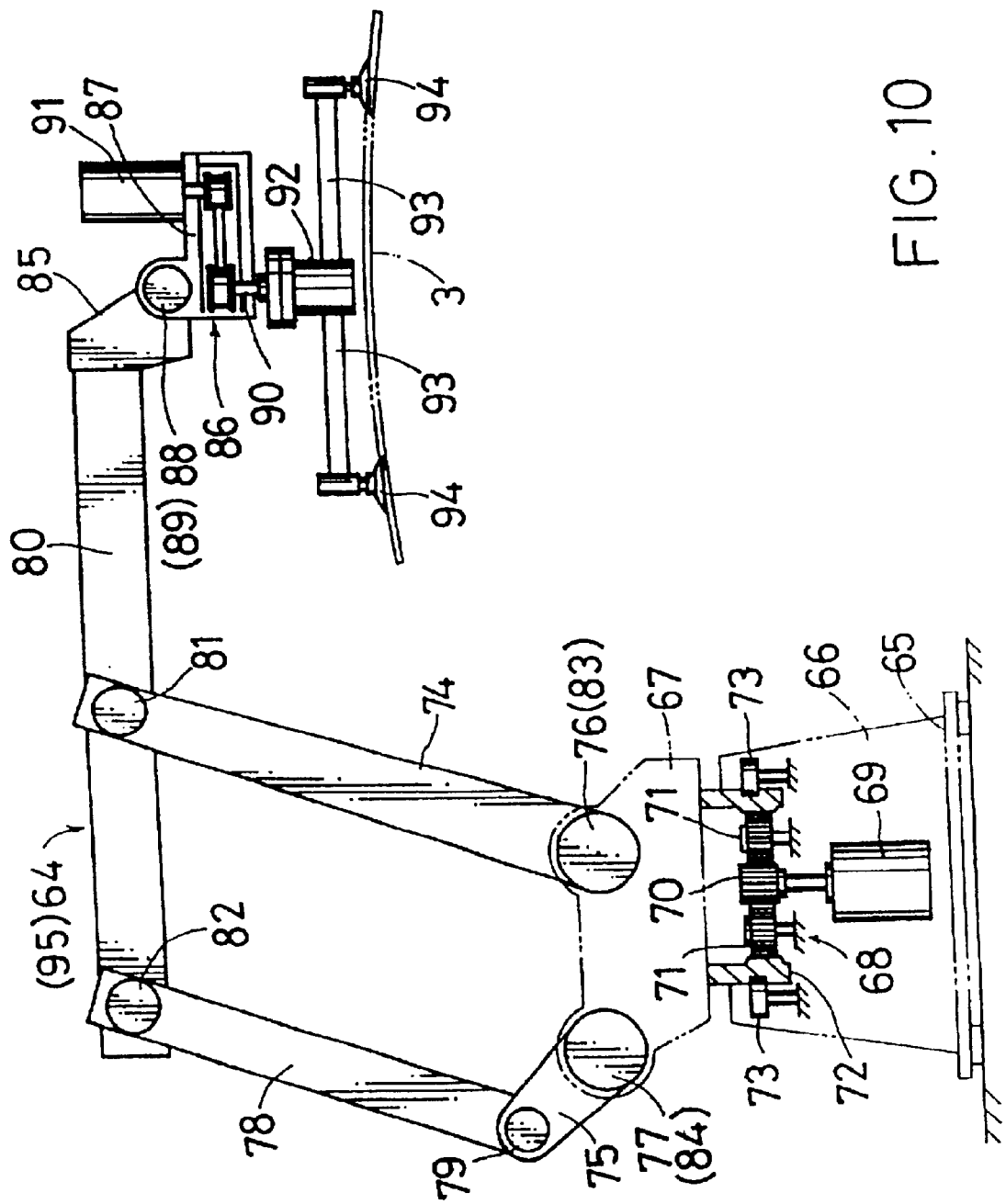
FIG. 10 is a sectional side view illustrating a driving mechanism for the panel supplying means.

Referring to FIGS. 9 and 10, there is shown the panel supplying means 64 for supplying the window glass 3 to the panel retaining means 60. A supporting member 66 is mounted on a case 65 fixed to the floor. A swivel member 67 is provided over an upper surface of the supporting member 66 so as to be swiveled by a planetary gear mechanism 68. That is, a sun gear 70 rotating together with an output shaft 69a of a motor 69 and a plurality of planetary gears 72 meshing with the sun gear 70 are provided in the supporting member 66. On the other hand, an outer ring gear 72 meshing with the planetary gears 71 is so formed as to project from a lower surface of the swivel member 67. The outer ring gear 72 is guided by a plurality of guide rollers 73 rotatably supported on the supporting member 66. Accordingly, the swivel member 67 is swiveled about the sun gear 70 by driving the motor 69 to rotate the sun gear 70 and accordingly rotate the outer ring gear 72 guided by the guide rollers 73.

A first arm 74 is rotatably supported at its lower end on the swivel member 67 by a rotating shaft 76 to be driven by a motor 83, and a second arm 75 is rotatably supported at its lower end on the swivel member 67 by a rotating shaft 77 to be driven by a motor 84. Further, a third arm 78 is pivotalby supported by a pin 79 at its lower end on an upper end of the second arm 75. A boom 80 is pivotably supported by two pins 81 and 82 on upper ends of the first arm 74 and the second arm 78. Accordingly, the boom 80 is advanced or retracted by driving the motor 83 to forwardly or reversely rotate the rotating shaft 76, and is also tilted about the pin 81 in a clockwise or counterclockwise direction as viewed in FIG. 10 by driving the motor 84 to forwardly or reversely rotate the rotating shaft 77.

A mounting member 85 is fixed to a fore end of the boom 80. A panel suction unit 86 for releasably sucking the window glass 3 is suspendedly supported on the mounting member 85 so as to be tilted about a rotating shaft 88 to be driven by a motor 89 in a clockwise or counterclockwise direction as viewed in FIG. 10. The panel suction unit 86 includes a unit body 87 adapted to be tilted by the rotation of the rotating shaft 88. A rotating shaft 90 to be driven by a motor 91 projects from a lower surface of the unit body 87. An arm supporting member 92 is attached to a lower flange of the rotating shaft 90. Four orthogonal arms 93 extend outwardly from the arm supporting member 92. Four suction cups 94 for sucking the window glass 3 are mounted on lower surfaces of the arms 93 at outer ends thereof, respectively. Each suction cup 94 is connected to a vacuum source (not shown).

The panel unit unloading means 95 for unloading the panel unit 2 from the panel retaining means 60 is juxtaposed with the panel supplying means 64. The panel unit unloading means 95 has the same construction as that of the panel supplying means 64. Therefore, the same parts as those of the panel supplying means 64 are designated by the same reference numerals in FIG. 4, and the explanation thereof will be omitted.

Figure 11:
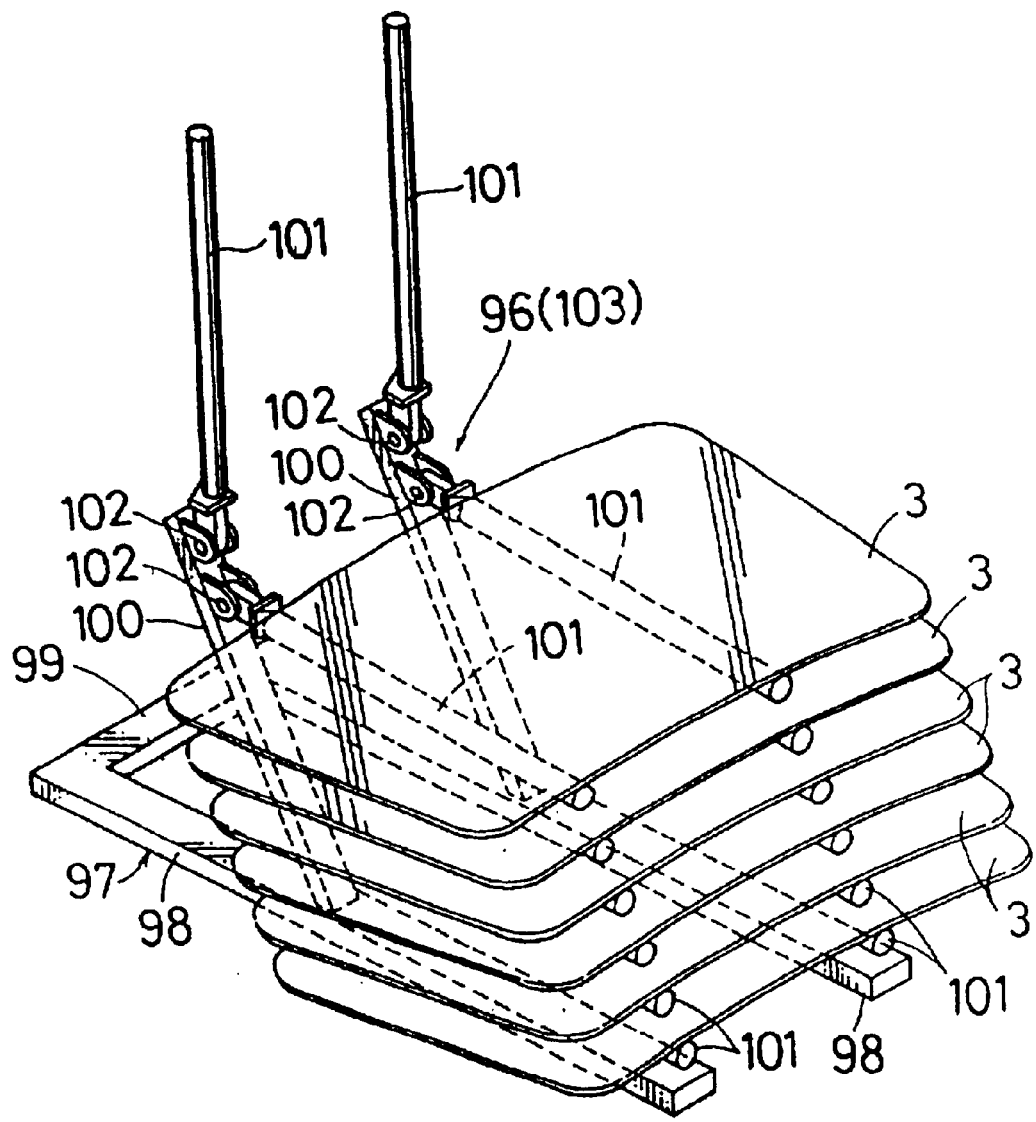
FIG. 11 is a perspective view of the panel reserving means shown is FIG. 4.

Referring to FIG. 11, there is shown the panel serving means 96 adapted to be movably disposed behind the panel supplying means 64. The panel serving means 96 includes a pallet base 97 movably disposed on the floor. The pallet base 97 is comprised of a pair of right and left side frames 98 and a rear frame 99 connecting rear ends of the side frames 98, thus forming a U-shaped configuration as viewed in plan.

A pair of right and left supporting frames 100 project from upper surfaces of the side frames 98 in such a manner as to be inclined rearwardly.

A plurality of pairs of panel supporting arms 101 are swingably supported at their base ends on front surfaces of the supporting frames 100 by plural pivotal shafts 102. Each panel supporting arm 101 is actuated by an actuating mechanism (not shown) between a horizontal position in which it supports the window glass 3 and a vertical position in which it waits for the window glass 3. The window glasses 3 are placed one by one on the lowermost pair of the panel supporting arms 101 to the uppermost pair of the panel reserving arms 101.

The panel unit receiving means 103 for receiving the panel units 2 one by one from the panel unloading means 95 is juxtaposed with the panel serving means 96. The panel unit receiving means 103 has substantially the same construction as that of the panel serving means 96. Therefore, the same parts as those of the panel serving means 96 are designated by the same reference numerals in FIG. 4, and the explanation thereof will be omitted.

(Pre-treatment Step)

The operation of the manufacturing apparatus thus constructed will now be described in connection with the manufacturing method of the panel unit.

The peripheral edge of the window glass 3 is preliminarily subjected to primer treatment, and it is then coated around the periphery with the resin adhesive 4 as shown in FIG. 2. After thus pre-treating a plurality of the window glasses 3, they are placed one by one on the panel supporting arms 101 of the panel serving means 96. Then, the panel serving means 96 is moved to a panel supplying position behind the panel supplying means 64 as shown in FIG. 4.

(Panel Supplying Step)

When the panel serving means 96 is moved to the panel supplying position, the panel supplying means 64 is operated. That is, the swivel member 67 is swiveled by the motor 69 to bring the boom 80 into orientation to the panel serving means 96. Then, the boom 80 is advanced and tilted down toward the uppermost window glass 3 in the panel reserving means 96 by driving the motors 83 and 84. At this time, the arm supporting member 92 of the panel suction unit 86 at the fore end of the boom 80 is tilted up by driving the motor 89, thereby maintaining the arms 93 of the arm supporting member 92 in their horizontal position.

When the suction cups 94 of the panel suction unit 86 are brought into abutment against an upper surface of the uppermost window glass 3 by the advancement and the tilt-down of the boom 80, the vacuum source connected to the suction cups 94 is operated to generate a vacuum in the suction cups 94, thereby holding the window glass 3.

When the window glass 3 is held by the suction cups 94, the boom 80 is retracted and tilted up by driving the motors 83 and 84 with the arms 93 of the panel suction unit 86 maintained in the horizontal position, so that the window glass 3 is lifted from the uppermost pair of the panel supporting arms 101 in the horizontal position.

Then, the swivel member 67 is swiveled again by driving the motor 69 to bring the boom 80 into orientation to the panel retaining means 60. Then, the boom 80 is advanced and tilted down toward the retaining member 61 of the panel retaining means 60. At this time, the arm supporting member 92 of the panel suction unit 86 is rotated by the motor 91 so that the peripheral edge of the window glass 3 retained by the panel suction unit 86 may be brought into a predetermined directional relation to the die means 11, that is, the lower portion of the peripheral edge of the window glass 3 may be directed to the die means 11. Then, the window glass 3 retained by the panel suction unit 86 is placed on the suction cups 63 provided on the arms 62 of the retaining member 61 of the panel retaining means 60. The slide table 26 of the panel moving means 24 is preliminarily retracted to its leftmost position as viewed in FIG. 7.

When the window glass 3 is placed on the suction cups 63 of the panel retaining means 60, the vacuum source connected to the suction cups 63 is operated to generate a vacuum in the suction cups 63. At the same time, the vacuum source connected to the suction cups 94 is turned off to restore atmospheric pressure in the suction cups 94. Thus, the window glass 3 is sucked by the suction cups 63 of the panel retaining means 60. On the other hand, the panel supplying means 64 having released the window glass 3 is operated to take up the next window glass 3 supported in the panel serving means 96 and is stopped at its waiting position shown in FIG. 4.

(Extrusion Molding Step)

In this preferred embodiment, each window glass 3 has curved glass surfaces as previously mentioned. Accordingly, the window glass 3 retained by the panel retaining means 60 is inclined by driving the motor 59 to rotate the second shaft 56 and thereby tilt the tilting member 57 and the retaining member 61, so as to bring a central part of the lower portion of the peripheral edge of the window glass 3 into a horizontal position. The peripheral edge is inserted into the side opening 22 of the mouthpiece 20 of the die means 11 as shown by a phantom line in FIG. 7. Further, the elevating cylinder 32 of the panel moving means 24 is lifted or lowered by driving the motor 33, so as to make the height of the central part of the lower portion of the window glass 3 equal to the height of the side opening 22 of the mouthpiece 20 of the die means 11.

Under such an adjusted condition, the slide table 26 is advanced to insert the central part of the lower portion of the peripheral edge of the window glass 3 by a given depth from the side opening 22 into the extrusion port 21 of the mouthpiece 20.

By the insertion of the peripheral edge of the window glass 3 into the extrusion port 21 of the mouthpiece 20, the molding space 23 corresponding to the cross section of the molding 5 is defined between the peripheral edge of the window glass 3 and the inner wall surface of the extrusion port 21.

Then, a molding material is supplied from the extruder 10 to the molding material supplying passage 15 in the die means 11, and is extruded through the molding space 23 from the extrusion port 21.

Figure 12:
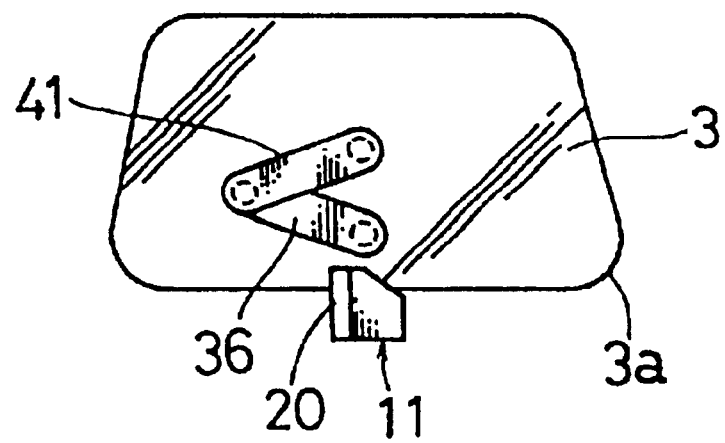
FIGS. 12, 13 and 14 are schematic plan views illustrating the operation wherein the molding is formed by extrusion molding along the peripheral edge of the window glass.

When the molding material is extruded from the extrusion port 21, the first and second swivel arms 36 and 41 are swiveled in predetermined directions, respectively. As a result, the lower portion of the peripheral edge of the window glass 3 is moved relative to the die means 11 under the condition where the former is inserted in the extrusion port 21 of the mouthpiece 20. The moving speed of the lower portion of the outer periphery of the window glass 3 is set to be substantially equal to the extruding speed. Thus, as shown in FIGS. 12 and 13, the molding 5 is continuously formed along the lower portion of the peripheral edge of the window glass 3 from the central part of the lower portion to a first corner portion 3a of the window glass 3.

Figure 13:
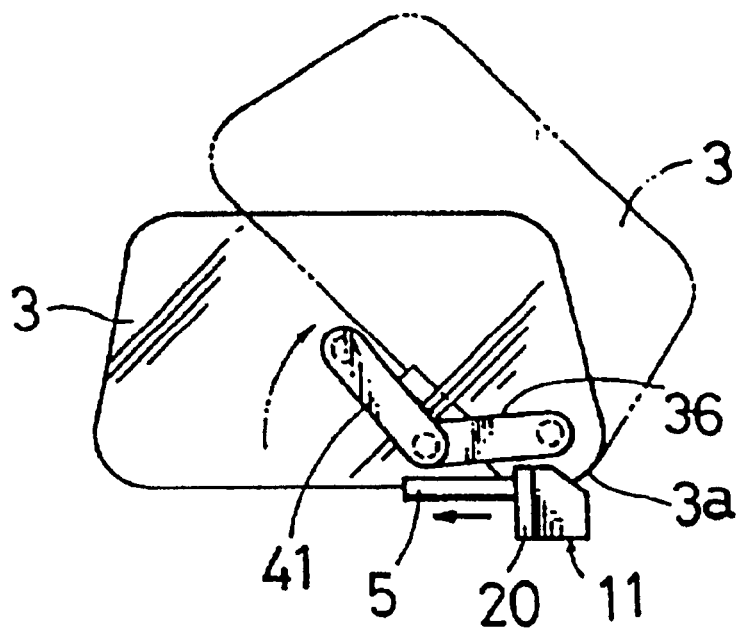

When the first corner portion 3a of the window glass 3 reaches the mouthpiece 20, the rotating member 48 is rotated simultaneously with the swiveling motion of the first and second swivel arms 36 and 41, thereby moving the first corner portion 3a relative to the die means 11 as shown by a phantom line in FIG. 13. At this time, the tilting member 57 is also tilted about the axes of the first and second shafts 55 and 56 so as to follow the curvature of the glass surfaces at the first corner portion 3a, thereby maintaining the horizontal position of the first corner portion 3a with respect to the mouthpiece 20.

Figure 14:
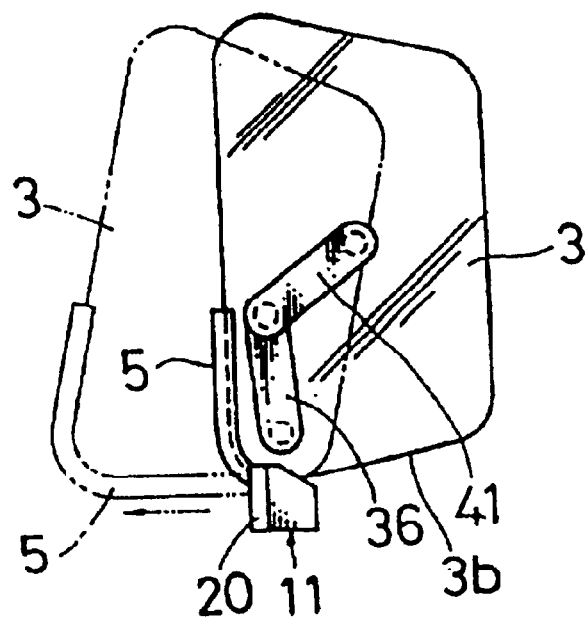

As shown in FIG. 14, when the first corner portion 3a of the window glass 3 passes through the mouthpiece 20, and a right portion 3b of the peripheral edge of the window glass 3 reaches the mouthpiece 20, the tilting member 57 is tilted so as to follow the curvature of the glass surfaces at the right portion 3b, thereby maintaining the right portion 3b in its horizontal position with respect to the mouthpiece 20. In the horizontal position, the right portion 3b of the peripheral edge of the window glass 3 is moved relative to the die means 11 by swiveling the first and second swivel arms 36 and 41, thereby continuously forming the molding 5 along the right portion 3b as shown by a phantom line in FIG. 14.

The peripheral edge of the window glass 3 is inserted in the extrusion port 21 of the mouthpiece 20 and is maintained in the horizontal position by the panel moving means 24 during the formation of the molding 5. The window glass 3 is rotated so that the extrusion port 21 is virtually moved along a predetermined orbital path around the peripheral edge of the window glass 3. Furthermore, the window glass 3 is rotated at a constant speed substantially equal to the extruding speed of the molding material to be extruded from the extrusion port 21. In this manner, the molding 5 is continuously formed along the peripheral edge of the window glass 3. The molding material extruded from the extrusion port 21 is immediately bonded to the peripheral edge of the window glass 3 coated with the resin adhesive 4 so that the molding 5 is assembled with the window glass 3 to form the panel unit 2.

Figure 16:
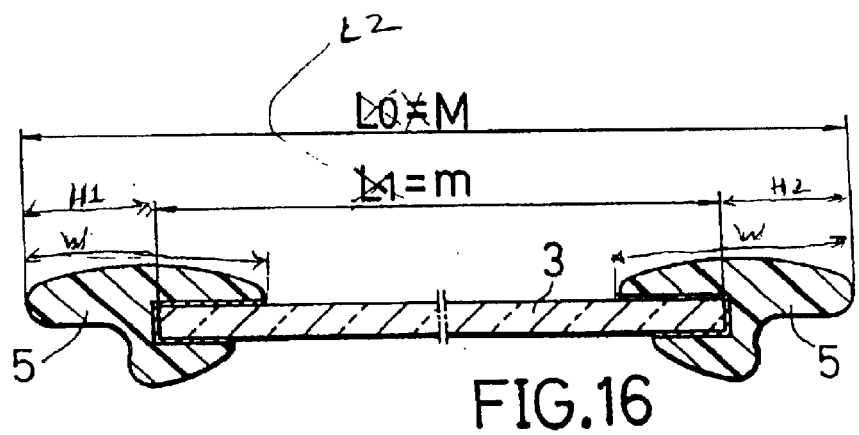
FIG. 16 is a sectional view of the panel unit in which the panel has a dimension identical with a desired value.

As shown in FIG. 16, if the longitudinal length of the window glass 3 is L2, which is the ideal longitudinal length m, the molding 5 is formed along the peripheral edge of the window glass 3 so that the longitudinal length of the panel unit 2 conforms to an ideal length M. As further shown in FIG. 16, the molding 5 has a longitudinal width W. A distance H1 is defined between a first peripheral edge of the window glass 3 and the outer peripheral edge of the molding 5 and a distance H2 is defined between a second peripheral edge of the window glass and the corresponding outer peripheral edge of the molding 5. By moving the window glass 3 along a predetermined orbit with respect to the extrusion port 21, the in situ formed molding 5 of the panel unit 2 will always have ideal external dimensions, regardless of variations in the size of the window glass 3.

Figure 17:
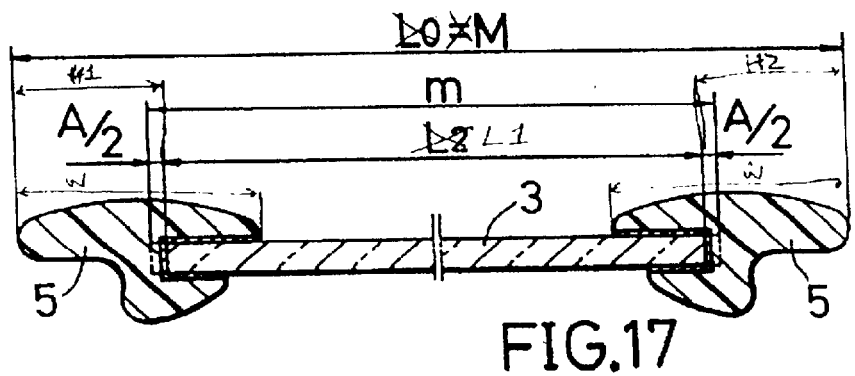
FIG. 17 is a sectional view of the panel unit in which the panel has a dimension smaller than a desired value.

As shown in FIG. 17, even if the longitudinal length of the window glass 3 is L1, which is less than the ideal longitudinal length m, the molding 5 is formed along the peripheral edge of the window glass 3 so that the longitudinal length of the panel unit 2 still conforms to the ideal length M. FIG. 17 shows that the length L1 of the window glass 3 is less than the ideal length m by the amount A (i.e., distances H1 and H2 of FIG. 17 are greater than distances H1 and H2 of FIG. 16) and the in situ molding 5 formed by moving the window glass 3 in a predetermined orbital path compensates for the difference A/2 at each side of the window glass 3 to provide a panel unit 2 having the ideal external dimensions.

Figure 18:
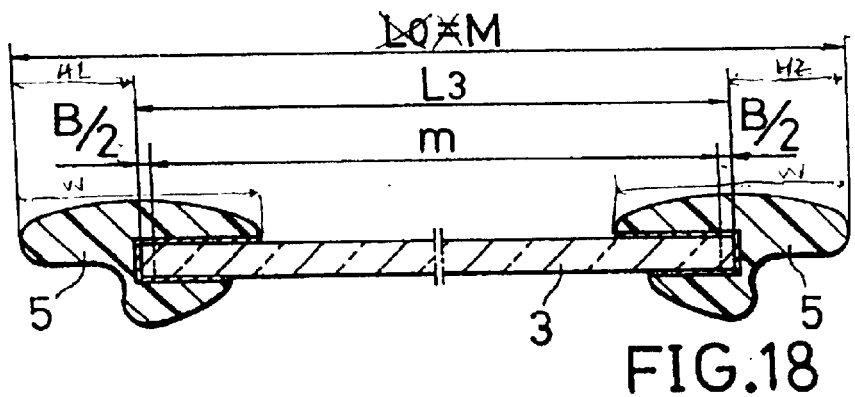
FIG. 18 is a sectional view of the panel unit in which the panel has a demension than a desired value.

Further, as shown in FIG. 18, even if the longitudinal length of the window glass 3 is L3, which is greater than the ideal longitudinal length m, the molding 5 is formed along the peripheral edge of the window glass 3 so that the longitudinal length of the panel unit 2 still conforms to the ideal constant length M. FIG. 18 shows that the length L3 of the window glass 3 is greater than the ideal length m by the amount B (i.e., distances H1 and H2 of FIG. 18 are less than distances H1 and H2 of FIG. 16) and the in situ molding 5 formed by moving the window glass 3 in a predetermined orbital path compensates for the difference B/2 at each side of the window glass 3 to provide a panel unit 2 having the ideal external dimensions.

As described above, even if there is a variation in the external dimension of the window glass 3, the molding 5 effectively compensates for the variation without departing from the ideal external dimension of the in situ formed molding 5, thereby permitting the consistent formation of panel units 2 having uniform external dimensions.

In the foregoing description, the tilting member 57 is controlled so that the peripheral edge of the window glass 3 maintains a desired angle with respect to the mouth piece 20. It is to be understood, however, that the invention is not to be limited to the description. Therefore, the tilting member 57 can be controlled so that the peripheral edge of the window glass 3 maintains a desired angle with respect to the mouth piece 20.

(Panel Unit Unloading Step)

When the molding 5 is formed along almost the entire peripheral edge of the window glass 3, the supply of the molding material is stopped.

After the panel unit 2 is obtained in the above-mentioned extrusion molding step, the slide table 26 of the panel moving means 24 is retracted to the original position, so as to remove the peripheral edge of the window glass 3 from the extrusion port 21 through the side opening 22 of the mouthpiece 20. Thereafter, the panel unit 2 is removed by the panel unit unloading means 95, and is placed on a lowermost pair of panel unit receiving arms 101 of the panel unit receiving means 103.

Similarly to the above operation, the remaining window glasses 3 placed on the remaining pairs of the panel supporting arms 101 of the panel serving means 96 in the pre-treatment step are supplied one by one to the panel retaining means 60 by the panel supplying step, and are then formed into the panel units 2 by the die means 11 in the extrusion molding step. Thereafter, the panel units 2 are removed one by one by the panel unit unloading means 95 to be received by the panel unit receiving arms 101 of the panel unit receiving means 103 in the panel unloading step. Finally, when the panel unit 2 is placed on the uppermost pair of the panel unit receiving arms 101 of the panel unit receiving means 103, the panel unit receiving means 103 including the panel units 2 is moved to a predetermined position.

(Post-treatment Step)

Figure 15:
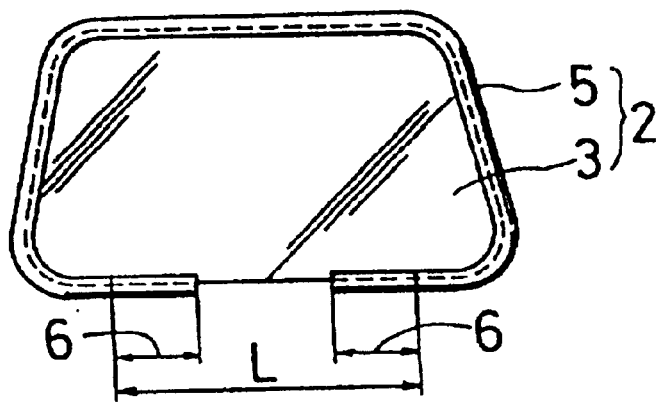
FIG. 15 is an elevational view of the panel unit obtained in the extrusion molding step of the manufacturing method according to the present invention.

In the case that the shape of the molding 5 becomes irregular just after starting of the extrusion molding and just before ending of the extrusion molding, a part of the molding 5 having such an irregular shape is eliminated as waste pieces 6 as shown in FIG. 15.

In general, the lower portion of the peripheral edge of the front window glass 3 for a vehicle is not provided with the molding 5. Accordingly, a part of the molding 5 formed along the lower portion of the peripheral edge of the window glass 3 can be eliminated as the waste pieces 6.

In the case that the panel is a rear window glass for a vehicle, it is necessary to mount a molding along the entire peripheral edge of the rear window glass. In this case, an additional molding piece (not shown) having a length L equal to the sum of lengths of the waste pieces 6 and the central part of the lower portion of the peripheral edge of the window glass as shown in FIG. 15 is formed independently of the molding 5. The additional molding piece is mounted on the lower portion of the peripheral edge of the window glass after forming the molding 5.

Although the above preferred embodiment employs the window glass 3 for a vehicle as the panel and the molding 5 as the frame, the panel and the frame in the present invention are not limited to the above. For instance, the panel may be a resin or metal panel.

Further, although the window glass 3 retained by the panel retaining means 60 is moved relative to the fixed die means 11 by the panel moving means 24 in the above preferred embodiment, the die means 11 may be connected to any moving means (not shown), and the panel retaining means 60 may be fixed, so that the die means 11 can be moved relative to the window glass 3 retained by the panel retaining means 60.

A panel unit according to a second embodiment of the present invention will now be described with reference to FIG. 19, wherein since method and apparatus for manufacturing the panel unit are the same as those for manufacturing the panel unit according to the first embodiment of the present invention, the explanation thereof will be omitted.

Figure 19:
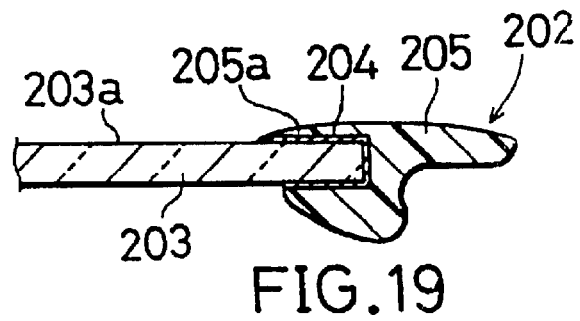
FIG. 19 is a fragmentary sectional view of a panel unit according to a second embodiment of the present invention.

As shown in FIG. 19, the panel unit is generally designated by the reference number 202 and is comprised of a window glass 203 and a molding 205 fixed to a peripheral edge of the window glass 203. The molding 205 is immediately bonded to the peripheral edge of the window glass 203 by means of resin adhesive 204. The molding 205 includes a portion 205a contacting the outer surface 203a of the window glass 203. As shown therein, the thickness of the portion 205a is extremely reduced for flowing air smoothly over the molding 205, thereby to enhance the aerodynamic performance of an automobile on which the panel unit 202 is mounted. In this embodiment, the thickness of the portion 205a is 1.5 mm or less.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A method of manufacturing a panel unit having a curved panel and a directly extruded molding, comprising:
   moving either one of the curved panel and an extrusion molding die with respect to the other of the curved panel and the extrusion molding die so that a peripheral edge of the curved panel moves relative to an extrusion port of the extrusion molding die and simultaneously extruding a resin molding material directly onto the peripheral edge of the curved panel;
   while extruding the molding material, maintaining an angle between the peripheral edge of the curved panel and the extrusion port constant during the relative movement between the curved panel and the extrusion port,
   stopping the extrusion of the molding material when the directly extruded molding is formed along almost the entire peripheral edge of the curved panel, and
   eliminating an irregular portion of the directly extruded molding, wherein a gap is formed between a first and second terminal end of the directly extruded molding that exposes a portion of the peripheral edge of the curved panel.

2. A method as in claim 1, wherein the extruding step further comprises moving the peripheral edge of the curved panel along a predetermined path relative to the extrusion port, wherein the directly extruded molding has a predetermined external dimension, even if the external dimension of the curved panel varies from an ideal external dimension.

3. A method as in claim 1, further comprising continuously moving the peripheral edge of the curved panel relative to the extrusion port of the extrusion molding and simultaneously bonding the molding material to the peripheral edge of the curved panel.

4. A method as in claim 1, further comprising connecting the first and second terminal ends of the directly extruded molding with an additional molding.

5. A method as in claim 1, further comprising mounting an additional molding piece in the gap, wherein the directly extruded molding and additional molding piece together extend around the entire peripheral edge including four corners of the curved panel.

6. A method as in claim 1, wherein the curved panel is an automobile window glass.

7. A method as in claim 6, further comprising continuously moving the peripheral edge of the automobile window glass relative to the extrusion port of the extrusion molding and simultaneously bonding the molding material to the peripheral edge of the automobile window glass.

8. A method as in claim 7, further comprising mounting an additional molding piece in the gap, wherein the directly extruded molding and additional molding piece together extend around the entire peripheral edge including four corners of the automobile window glass.

9. A method as in claim 1, wherein the peripheral edge of the curved panel is disposed proximally to the extrusion port during the extrusion molding step.

10. A method as in claim 9, wherein the peripheral edge of the curved panel is inserted into the extrusion port during the extrusion molding step.

11. A method as in claim 10, wherein the curved panel is an automobile window glass.

12. A method as in claim 11, further comprising continuously moving the peripheral edge of the automobile window glass relative to the extrusion port of the extrusion molding and simultaneously bonding the molding material to the peripheral edge of the automobile window glass.

13. A method as in claim 12, further comprising mounting an additional molding piece in the gap, wherein the directly extruded molding and additional molding piece together extend around the entire peripheral edge and four corners of the automobile window glass.

14. A method as in claim 1, wherein the extrusion port is fixed in position and the peripheral edge of the curve panel moves with respect to the extrusion port.

15. A method as in claim 14, wherein the peripheral edge of the curved panel is disposed proximally to the extrusion port during the extrusion molding step.

16. A method as in claim 15, wherein the peripheral edge of the curved panel is inserted into the extrusion port during the extrusion molding step.

17. A method of manufacturing a panel unit including a curved window glass panel, and a frame mounted on a peripheral edge of the curved window glass panel, comprising:

providing a molding die having an extrusion port for extruding a molding material to form the frame, wherein the extrusion port has an inner circumferential surface that corresponds to an outer cross section of the frame;

disposing the peripheral edge of the curved window glass panel proximally with respect to the extrusion port in order to form a molding space defined by the peripheral edge of the curved window glass panel and the inner circumferential surface of the extrusion port, wherein the molding space corresponds to the cross section of the frame;

extruding the molding material into the molding space;

controllably maintaining an angle between the peripheral edge of the curved window glass panel and the molding die constant;

continuously moving either one of the curved window glass panel and the molding die with respect to the other of the curved window glass panel and the molding die in order to continuously extrude the molding material along the peripheral edge of the curved window glass panel, thereby forming a directly extruded molding, stopping the extrusion of the molding material when the directly extruded molding is formed along almost the entire peripheral edge of the curved window glass panel, and eliminating an irregular portion of the directly extruded molding, wherein a gap is formed between a first and second terminal end of the directly extruded molding that exposes a portion of the peripheral edge of the curved window glass panel.

18. A method as defined in claim 17, wherein the peripheral edge df the window glass panel moves along a predetermined orbital path with respect to the molding die, and wherein the panel unit has a predetermined external dimension that does not depend upon the external dimension of the panel.

* * * * *